United States Patent
Muthiah

(10) Patent No.: US 11,240,540 B2
(45) Date of Patent: Feb. 1, 2022

(54) STORAGE SYSTEM AND METHOD FOR FRAME TRIMMING TO OPTIMIZE NETWORK BANDWIDTH

(71) Applicant: Western Digital Technologies, Inc., San Jose, CA (US)

(72) Inventor: Ramanathan Muthiah, Karnataka (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/899,262

(22) Filed: Jun. 11, 2020

(65) Prior Publication Data

US 2021/0392388 A1    Dec. 16, 2021

(51) Int. Cl.
  *H04N 21/2343*  (2011.01)
  *H04N 21/218*   (2011.01)

(52) U.S. Cl.
  CPC . *H04N 21/234381* (2013.01); *H04N 21/2182* (2013.01)

(58) Field of Classification Search
  CPC .................. H04N 21/234; H04N 21/2182
  See application file for complete search history.

(56) References Cited

U.S. PATENT DOCUMENTS

| | | | | |
|---|---|---|---|---|
| 6,002,802 A  * | 12/1999 | Chujoh | ................ | H04N 19/176 375/E7.027 |
| 6,931,658 B1 * | 8/2005  | Kawamura | ............ | H04N 7/185 348/E7.088 |
| 7,483,489 B2 | 1/2009 | Gentric et al. | | |
| 7,627,886 B2 * | 12/2009 | Barbanson | ....... | H04N 21/23439 725/100 |
| 8,209,733 B2 | 6/2012 | Quigley et al. | | |
| 8,966,556 B2 | 2/2015 | Sharp et al. | | |
| 10,219,014 B2 * | 2/2019 | Van Dusen | .......... | H04N 21/234 |
| 10,425,612 B2 | 9/2019 | Boncha et al. | | |
| 10,455,194 B1 * | 10/2019 | Yang | ....................... | H04L 47/25 |

(Continued)

FOREIGN PATENT DOCUMENTS

| | | | |
|---|---|---|---|
| EP | 0901285 A1 | 3/1999 | |
| EP | 1622385 A1 | 2/2006 | |

(Continued)

OTHER PUBLICATIONS

International Search Report completed May 11, 2021 for International Application No. PCT/US2021/016323.

(Continued)

*Primary Examiner* — Peter D Le
(74) *Attorney, Agent, or Firm* — Crowell & Moring LLP

(57) ABSTRACT

A storage system and method for frame trimming to optimize network bandwidth are provided. In one embodiment, a controller of the storage system is configured to receive a request from a host for a video stream stored in the memory, wherein the request comprises an instruction to reduce a frame rate of the video stream due to bandwidth consumption on a network connecting the host and a playback system being more than a threshold; retrieve the video stream from the memory of the storage system; remove frames from the video stream to reduce the frame rate of the video stream per the instructions from the host; and send the reduced-framerate video stream to the host. Other embodiments are provided.

20 Claims, 7 Drawing Sheets

(56) References Cited

U.S. PATENT DOCUMENTS

| | | | |
|---|---|---|---|
| 2002/0122656 A1* | 9/2002 | Gates | H04H 60/27 386/214 |
| 2003/0093801 A1* | 5/2003 | Lin | H04N 21/2343 725/90 |
| 2003/0142751 A1* | 7/2003 | Hannuksela | H04N 19/142 375/240.25 |
| 2003/0225746 A1 | 12/2003 | Braun et al. | |
| 2004/0184540 A1* | 9/2004 | Miura | H04N 21/2362 375/240.12 |
| 2005/0102479 A1* | 5/2005 | Innan | G06F 3/0607 711/162 |
| 2007/0154065 A1* | 7/2007 | Kellerer | H04N 19/587 382/100 |
| 2009/0052407 A1* | 2/2009 | Motegi | H04W 28/10 370/336 |
| 2010/0037267 A1* | 2/2010 | Bennett | H04N 21/8549 725/56 |
| 2013/0254611 A1 | 9/2013 | Amerga et al. | |
| 2014/0075096 A1 | 3/2014 | Tanaka et al. | |
| 2014/0143385 A1* | 5/2014 | Neff | H04L 65/602 709/219 |
| 2015/0261452 A1 | 9/2015 | Moon et al. | |
| 2016/0360148 A1* | 12/2016 | Mahapatro | H04N 19/172 |
| 2017/0285949 A1 | 10/2017 | Trika et al. | |
| 2018/0088860 A1* | 3/2018 | Erickson | G06F 3/061 |
| 2019/0034269 A1* | 1/2019 | Kalavade | H03M 13/1128 |
| 2019/0043201 A1 | 2/2019 | Strong et al. | |
| 2019/0182518 A1* | 6/2019 | Mittal | H04L 65/607 |
| 2019/0187936 A1 | 6/2019 | Naing et al. | |
| 2019/0294730 A1 | 9/2019 | Jenkins et al. | |
| 2020/0221147 A1* | 7/2020 | Batra | H04N 21/234381 |

FOREIGN PATENT DOCUMENTS

| | | |
|---|---|---|
| EP | 2359596 A1 | 8/2011 |
| EP | 2359596 B1 | 8/2011 |
| EP | 2712660 A2 | 4/2014 |
| KR | 10-2018-0015101 A | 10/2018 |

OTHER PUBLICATIONS

Written Opinion completed May 11, 2021 for International Application No. PCT/US2021/016323.
Israel Patent Office Search Strategy completed May 2, 2021 for International Application No. PCT/US2021/016323.
Non-final Office Action dated Jul. 15, 2021 for U.S. Appl. No. 16/781,688.
International Search Report dated Jul. 6, 2021 for International Application No. PCT/US2020/037903.
Written Opinion dated Jul. 6, 2021 for International Application No. PCT/US2020/037903.

* cited by examiner

STORAGE SYSTEM AND METHOD FOR FRAME TRIMMING TO OPTIMIZE NETWORK BANDWIDTH

BACKGROUND

In some environments, a playback system is connected to a host over a network. When the playback system wants to play video data, the playback system sends a request over the network to the host. The host retrieves the video data from a memory in a storage system and then sends the video data over the network to the playback system. If bandwidth consumption on the network is high, the video data may need to be buffered on the host until more bandwidth becomes available.

DETAILED DESCRIPTION

Overview

Figure 1A:
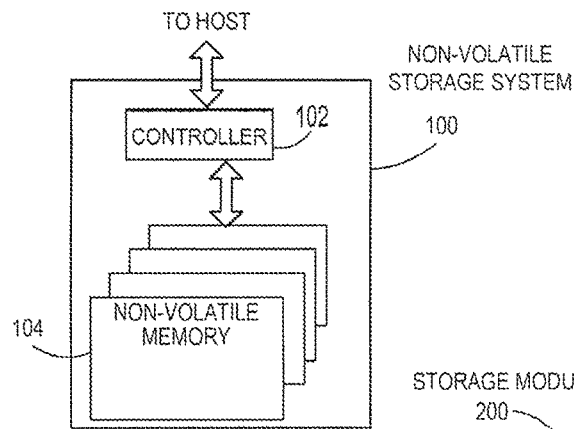
FIG. 1A is a block diagram of a non-volatile storage system of an embodiment.

By way of introduction, the below embodiments relate to a storage system and method for frame trimming to optimize network bandwidth. In one embodiment, a storage system is provided comprising a memory and a controller. The controller is configured to receive a request from a host for a video stream stored in the memory, wherein the request comprises an instruction to reduce a frame rate of the video stream due to bandwidth consumption on a network connecting the host and a playback system being more than a threshold; retrieve the video stream from the memory of the storage system; remove frames from the video stream to reduce the frame rate of the video stream per the instructions from the host; and send the reduced-frame-rate video stream to the host.

In some embodiments, a number of frames that are removed from the video stream is sufficient to satisfy a quality of service requirement.

In some embodiments, the controller is further configured to remove bidirectional frames from a group of pictures in the video stream.

In some embodiments, the controller is further configured to remove predicted frames from a group of pictures in the video stream.

In some embodiments, the controller is further configured to remove an entire group of pictures from the video stream.

In some embodiments, the controller is further configured to stop removing video frames from the video stream in response from an instruction from the host.

In some embodiments, the memory comprises a three-dimensional memory.

In another embodiment, a method is provided that is performed in a host in communication with a storage system and with a playback system. The method comprises retrieving video data from a memory of the storage system; determining whether bandwidth consumption on a network connecting the host and the playback system is more than a threshold; in response to determining that the bandwidth consumption on the network connecting the host and the playback system is more than the threshold, trimming a number of frames from the video data retrieved from the memory of the storage system; and sending the trimmed video data to the playback system.

In some embodiments, the number of frames that are trimmed is such that a frames-per-second of the trimmed video data is sufficient to satisfy a quality of service requirement.

In some embodiments, the method further comprises trimming bidirectional frames from a group of pictures in the video data.

In some embodiments, the method further comprises trimming predicted frames from a group of pictures in the video data.

In some embodiments, the method further comprises trimming an entire group of pictures from the video data.

In some embodiments, the method further comprises trimming the number of frames from the video data in response to determining that the bandwidth consumption on the network connecting the host and the playback system is less than the threshold.

In another embodiment, a storage system is provided comprising a memory; means for receiving a request from a host for a video stored in the memory, wherein the request comprises an instruction to trim a number of frames from the video; and means for trimming the number of frames from the video prior to sending the video to the host.

In some embodiments, a number of frames that are trimmed from the video is sufficient to satisfy a quality of service requirement.

In some embodiments, the storage system further comprises means for trimming bidirectional frames from the video.

In some embodiments, the storage system further comprises means for trimming predicted frames from the video.

In some embodiments, the storage system further comprises means for trimming an entire group of pictures from the video.

In some embodiments, the storage system further comprises means for stopping trimming video frames from the video in response from an instruction from the host.

In some embodiments, the memory comprises a three-dimensional memory.

Other embodiments are possible, and each of the embodiments can be used alone or together in combination. Accordingly, various embodiments will now be described with reference to the attached drawings.

EMBODIMENTS

Figure 1B:
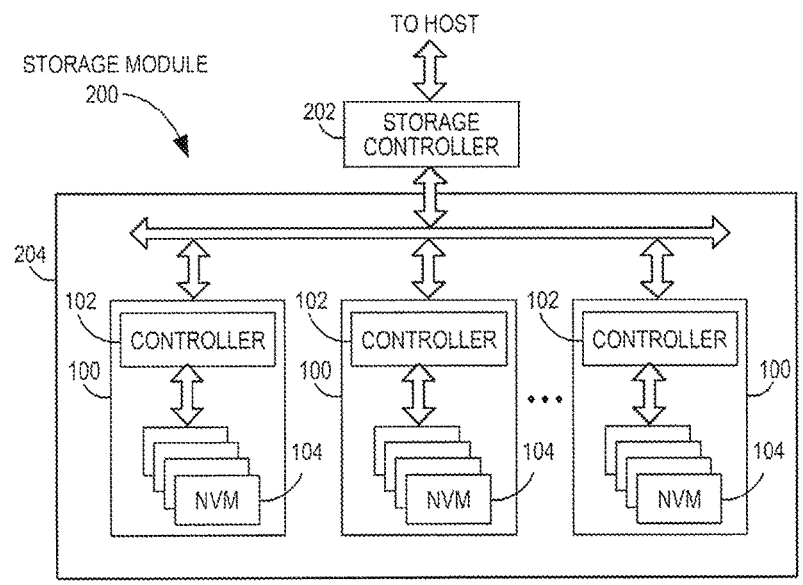
FIG. 1B is a block diagram illustrating a storage module of an embodiment.
Figure 1C:
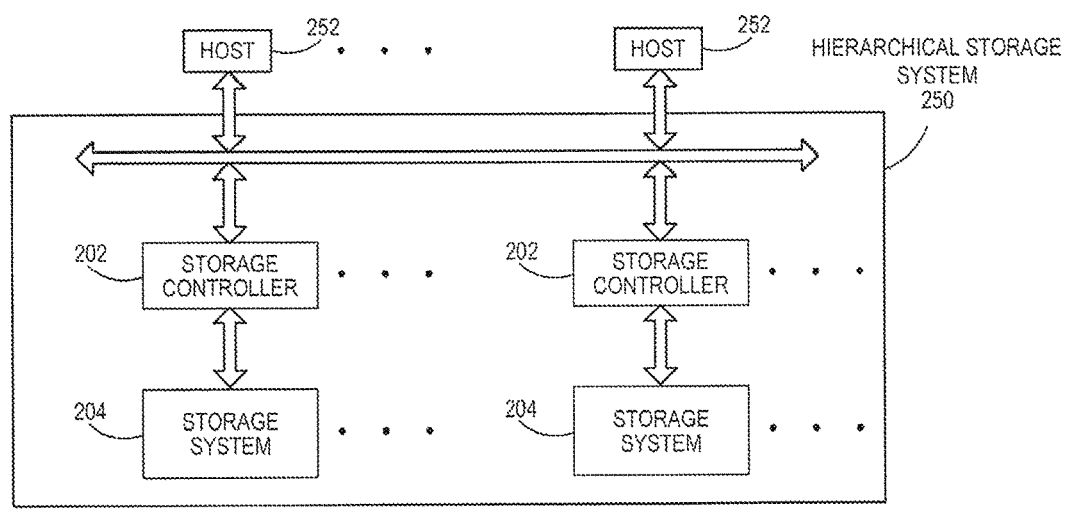
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
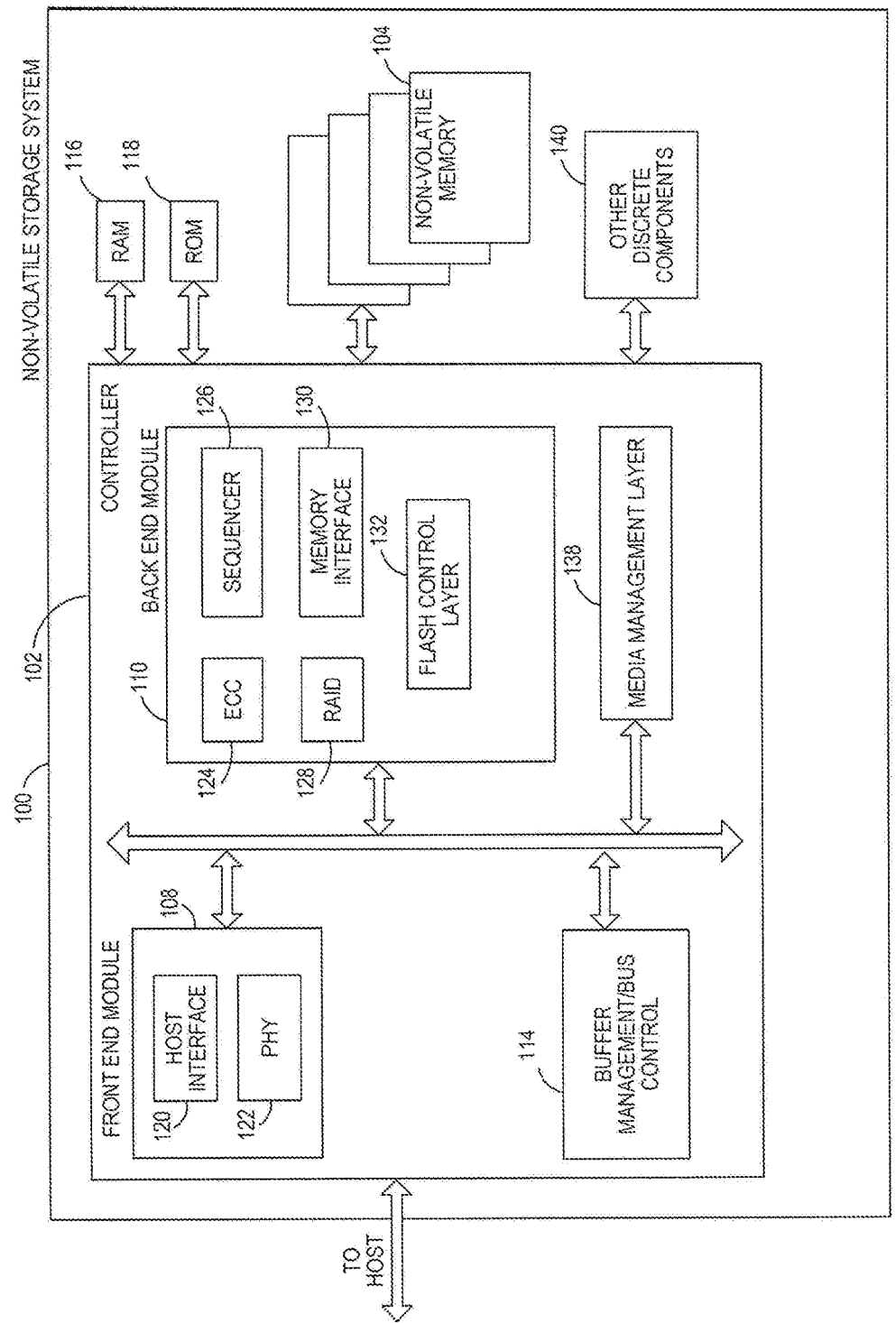
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM)

118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
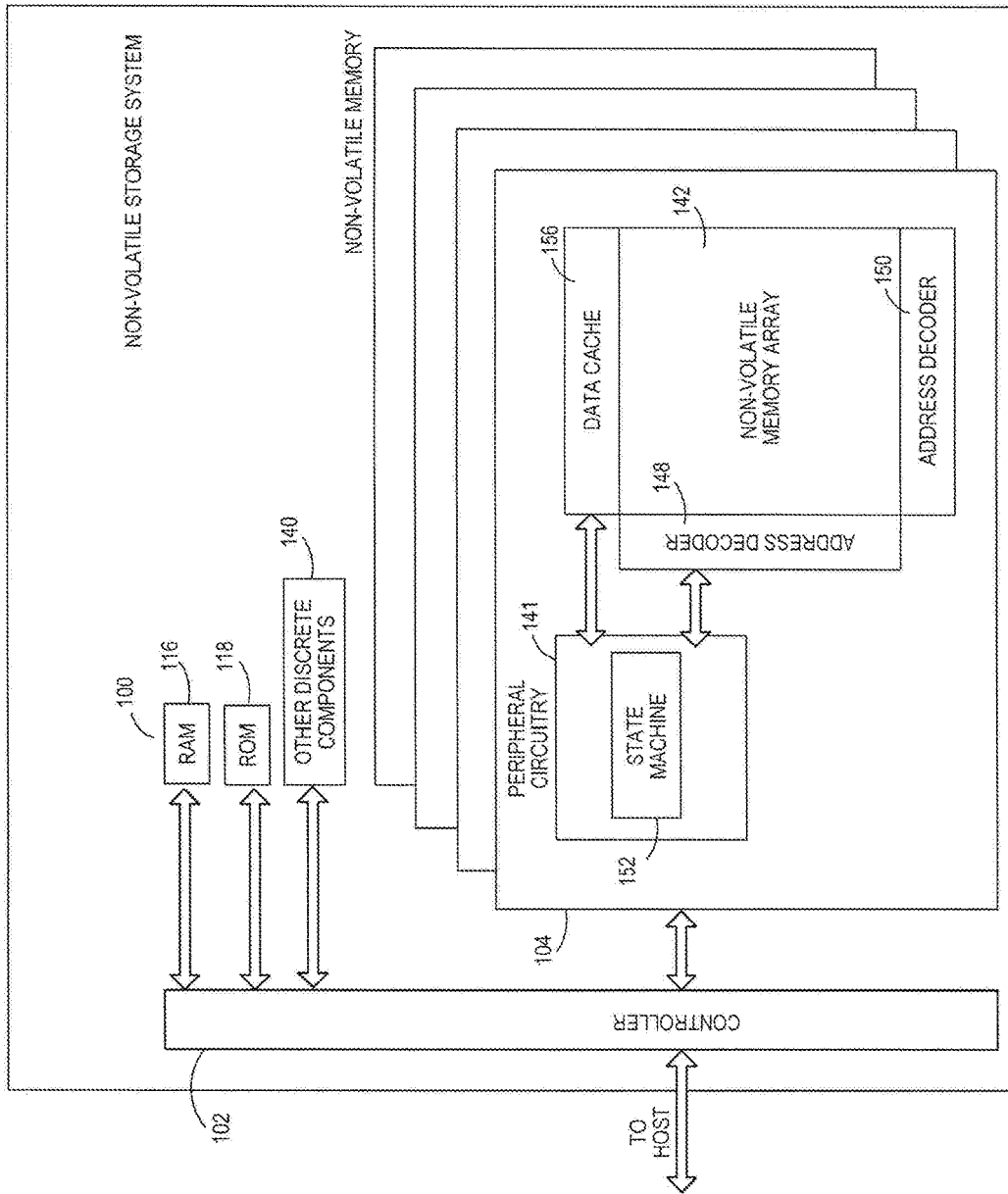
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
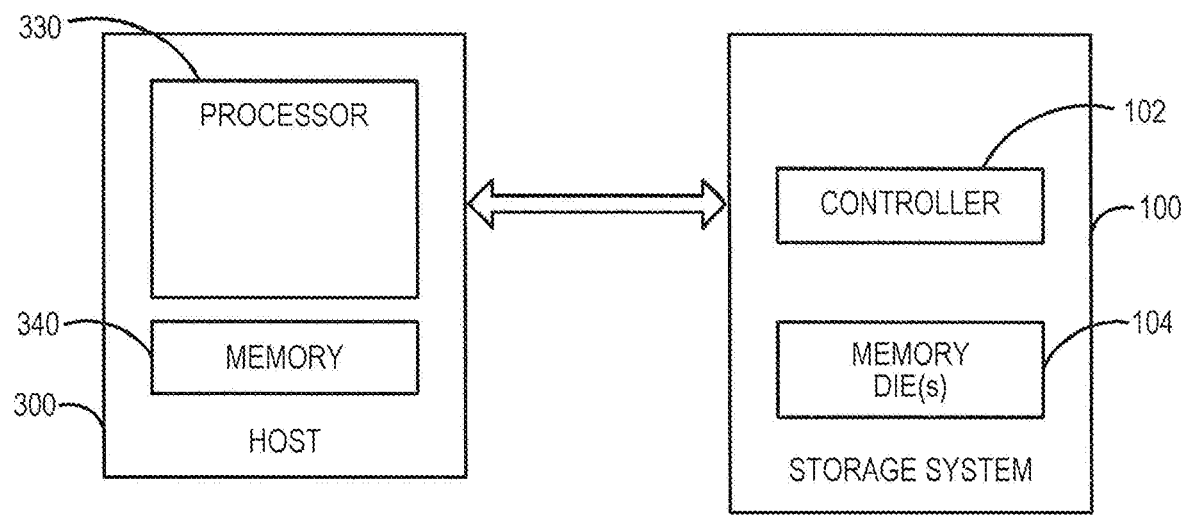
FIG. 3 is a block diagram of a host and storage system of an embodiment.

Turning again to the drawings, FIG. 3 is a block diagram of a host 300 and storage system (sometimes referred to herein as a "device") 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to read data from and write data to the storage system 100, as well as perform at least the functions described herein 100.

Figure 4:
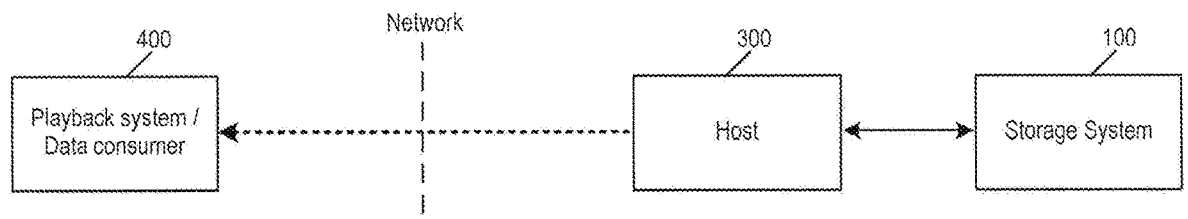
FIG. 4 is a block diagram of a playback system, host, and storage system of an embodiment.

As mentioned above and as shown in FIG. 4, a playback system 400 (e.g., a computer or other computing device with a media player) used by a data consumer (user) can be connected to the host 300 over a network. When the playback system 400 wants to play video data, the playback system 400 sends a request over the network to the host 300. The host 300 retrieves the video data from the memory 104 in the storage system 100 and then sends the video data over the network to the playback system 400. If bandwidth consumption on the network is high, the video data may need to be buffered on the host 300 until more bandwidth becomes available. That is, even if the system and network are designed to keep a sufficient margin of error, end applications share this premium resource. As a result, during peak usage time where network bandwidth is a premium, there may be slowness, which can result in video buffering or an automatic video pause. This may be undesirable to the data consumer of the playback system 400, and the following embodiments can be used to address this situation. With these embodiments, the data consumer may experience a delayed or jumpy video just once, thus avoiding a prolonged disturbance in buffered media for a live decode. This can result in a better quality of service for the available bandwidth.

In general, with these embodiments, the host 300 receives a request for video data from the playback system 400 and determines whether bandwidth consumption on a network connecting the host 300 and the playback system 400 is more than a threshold (bandwidth consumption can be detected using any known technique). If it is, the host 300 or the storage system 100 trims a number of frames from the video data retrieved from the memory 104 of the storage system 100 and then sends the trimmed video data to the playback system 400. The number of frames that are trimmed can be determined such that a frame rate (e.g., frames-per-second) of the trimmed video data is sufficient to satisfy a quality of service requirement of the media application on the playback system. Any suitable frame trimming technique can be used. For example, bidirectional (B) frames from a group of pictures (GOP) can be trimmed as a first step. The host 300 can trim predicted (P) frames as a second step after further evaluating quality of services versus bandwidth requirements. For coarse trimming, the host 300 can drops an entire group of pictures. Once the bandwidth consumption is less than the threshold, the system can stopping trimming frames.

Figure 5:
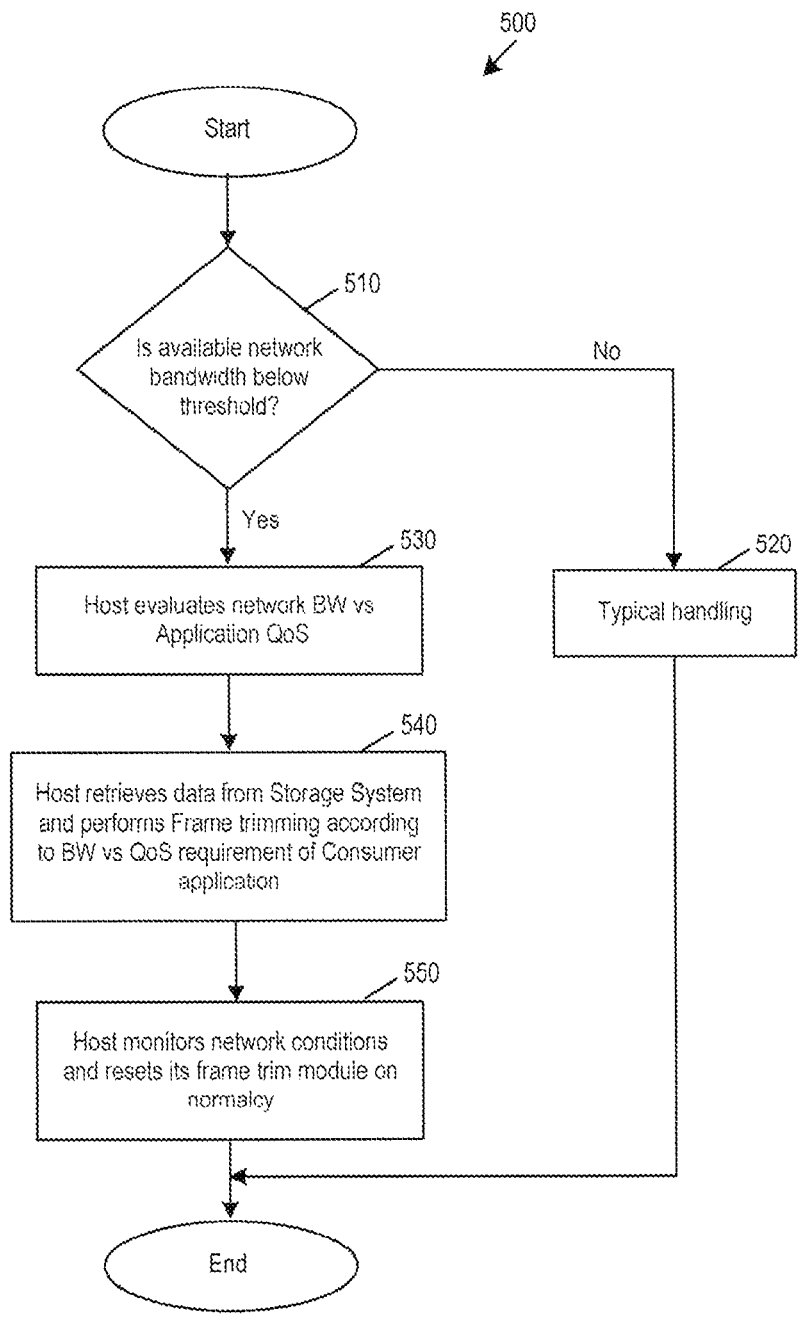
FIG. 5 is a flow chart of a method of an embodiment for frame trimming by a host to optimize network bandwidth.

Turning again to the drawings, FIG. 5 is a flow chart 500 of a method of an embodiment for frame trimming by the host 300 to optimize network bandwidth. As shown in FIG. 5, the host 300 determines if the available network bandwidth is below a threshold (act 510). If it is not, typical handling takes place (act 520). If it is, the host 300 evaluates the network bandwidth versus the playback system's/application's quality of service requirement (act 630). The host 300 then retrieves data from the storage system 100 and performs frame trimming according to the bandwidth versus quality of service requirement of the playback system/application (act 540). The host 300 monitors network conditions and resets its frame trim module on normalcy (act 550).

Figure 6:
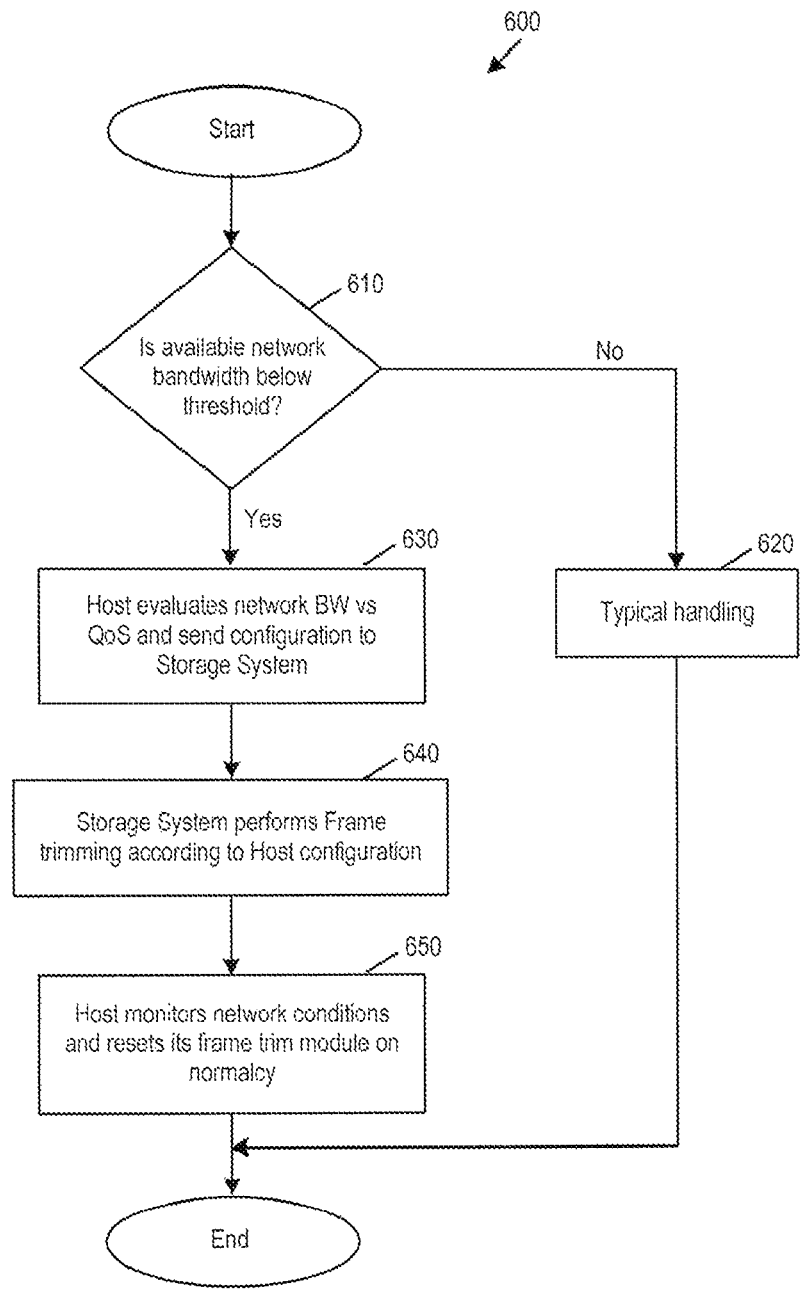
FIG. 6 is a flow chart of a method of an embodiment for frame trimming by a storage system to optimize network bandwidth.

As mentioned above, instead of the host 300 doing the frame trimming, the storage system 100 can do the frame trimming. With the storage system 100 performing the trimming, data transfer from the storage system 100 to the host 300 is reduced, thereby reducing transfer time. FIG. 6 is a flow chart 600 of a method of this alternative. As shown in FIG. 6, the host 300 determines if the available network bandwidth is below a threshold (act 610). If it is not, typical handling takes place (act 620). If it is, the host 300 evaluates the network bandwidth versus the playback system's/application's quality of service requirement and sends configuration information to the storage system 100 (act 630). The host 300 can instruct the storage system 100 to remove certain frames or certain types of frames for a group of pictures (GOP) according to the consumer's acceptable quality of service (QoS) level. The storage system 100 then performs frame trimming according to the configuration information sent from the host 300 (act 640). The host 300 monitors network conditions and resets its frame trim module on normalcy (act 650).

Irrespective of whether the host 300 or the storage system 100 is doing the trimming, there are several advantages associated with these embodiments. For example, these embodiments minimize unwanted video buffering, minimize the overall bitrate, and reduce network usage, all while enable trading of quality of service for network bandwidth. Also, with these embodiments, the data consumer only takes a hit once with jumpy video and avoids discontinuous buffering media for a live decode over a longer period of time. In other words, these embodiments trade a fast-forward-like jumpy video once for prolonged buffering issues. This results in better quality of service for the bandwidth. Briefly reducing the frame-per-second rate during network issues enables the system to catch up quickly and perform better.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller configured to:
receive a request from a host for a video stream stored in the memory, wherein the request comprises an instruction to reduce a frame rate of the video stream because bandwidth consumption on a network connecting the host and a playback system will result in a pause in playback of the video stream by the playback system;
retrieve the video stream from the memory of the storage system; and
remove frames from the video stream to reduce the frame rate of the video stream down to an amount that will avoid the pause in the playback of the video stream by the playback system but not below an amount that is sufficient to satisfy a quality of service requirement of the playback system;
wherein the controller is further configured to remove the frames by:
removing bidirectional (B) frames from a group of pictures (GOP); then
removing predicted (P) frames from the GOP in response to determining that removing the bidirectional (B) frames is not sufficient to avoid the pause in the playback of the video stream by the playback system; and then
removing all remaining frames of the GOP in response to determining that removing the predicted (P) frames is not sufficient to avoid the pause in the playback of the video stream by the playback system.

2. The storage system of claim 1, wherein the memory comprises a three-dimensional memory.

3. The storage system of claim 1, wherein the memory is configured to be integrated in the storage system.

4. The storage system of claim 1, wherein the memory is configured to be removably connected with the storage system.

5. The storage system of claim 1, wherein the storage system is configured to be integrated in the host.

6. The storage system of claim 1, wherein the storage system is configured to be removably connected with the host.

7. The storage system of claim 1, wherein the controller is further configured to send the reduced-frame-rate video stream to the host.

8. The storage system of claim 1, wherein the pause in the playback is associated with video buffering.

9. The storage system of claim 1, wherein a delay in playback occurs while the frames are removed.

10. The storage system of claim 1, wherein the controller is further configured to determine whether bandwidth consumption on the network will result in the pause in the playback by comparing the bandwidth consumption to a threshold.

11. The storage system of claim 1, wherein the controller is further configured to receive information from the host regarding which frames to remove.

12. A method comprising:
performing the following in a host in communication with a storage system and with a playback system:
retrieving video data from a memory of the storage system;

determining whether bandwidth consumption on a network connecting the host and the playback system will result in a pause in playback of the video data by the playback system; and in response to determining that the bandwidth consumption on the network will result in a pause in playback of the video data by the playback system, trimming a number of frames from the video data retrieved from the memory of the storage system to reduce the frame rate of the video data down to an amount that will avoid the pause in the playback of the video data by the playback system but not below an amount that is sufficient to satisfy a quality of service requirement of the playback system;

wherein the trimming comprises:

trimming bidirectional (B) frames from a group of pictures (GOP); then trimming predicted (P) frames from the GOP in response to determining that trimming the bidirectional (B) frames is not sufficient to avoid the pause in the playback of the video data by the playback system; and then trimming all remaining frames of the GOP in response to determining that trimming the predicted (P) frames is not sufficient to avoid the pause in the playback of the video data by the playback system.

13. The method of claim 12, wherein the storage system is configured to be integrated in the host.

14. The method of claim 12, wherein the storage system is configured to be removably connected with the host.

15. The method of claim 12, further comprising sending the trimmed video data to the playback system.

16. The method of claim 12, wherein the pause in the playback is associated with video buffering.

17. The method of claim 12, wherein a delay occurs while the frames are trimmed.

18. The method of claim 12, further comprising determining whether bandwidth consumption on the network will result in the pause in the playback by comparing the bandwidth consumption to a threshold.

19. The method of claim 12, wherein the memory comprises a three-dimensional memory.

20. A storage system comprising:

a memory;

means for receiving a request from a host for a video stream stored in the memory, wherein the request comprises an instruction to reduce a frame rate of the video stream because bandwidth consumption on a network connecting the host and a playback system will result in a pause in playback of the video stream by the playback system;

means for retrieving the video stream from the memory of the storage system; and means for removing frames from the video stream to reduce the frame rate of the video stream down to an amount that will avoid the pause in the playback of the video stream by the playback system but not below an amount that is sufficient to satisfy a quality of service requirement of the playback system by:

removing bidirectional (B) frames from a group of pictures (GOP); then removing predicted (P) frames from the GOP in response to determining that removing the bidirectional (B) frames is not sufficient to avoid the pause in the playback of the video stream by the playback system; and then removing all remaining frames of the GOP in response to determining that removing the predicted (P) frames is not sufficient to avoid the pause in the playback of the video stream by the playback system.

* * * * *